US012505194B2

(12) United States Patent
Yeager et al.

(10) Patent No.: US 12,505,194 B2
(45) Date of Patent: Dec. 23, 2025

(54) ENHANCED AUTHENTICATION LEVERAGING GRAPHICAL PASSWORDS AND BEHAVIORAL DATA

(71) Applicant: Bank of America Corporation, Charlotte, NC (US)

(72) Inventors: Stephen L. Yeager, Seattle, WA (US); Hitesh Shah, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 220 days.

(21) Appl. No.: 18/439,408

(22) Filed: Feb. 12, 2024

(65) Prior Publication Data

US 2025/0258900 A1 Aug. 14, 2025

(51) Int. Cl.
*G06F 21/00* (2013.01)
*G06F 21/31* (2013.01)
*G06F 21/36* (2013.01)

(52) U.S. Cl.
CPC ............ *G06F 21/36* (2013.01); *G06F 21/316* (2013.01)

(58) Field of Classification Search
CPC ......... G06F 21/36; G06F 21/316; G06F 21/32
See application file for complete search history.

(56) References Cited

U.S. PATENT DOCUMENTS

| 10,360,464 B1* | 7/2019 | McKay | G06V 40/172 |
| 10,698,998 B1* | 6/2020 | Moore | G06F 21/36 |
| 2020/0134160 A1* | 4/2020 | Maaroufi | G06F 21/36 |

* cited by examiner

*Primary Examiner* — William A Corum, Jr.
(74) *Attorney, Agent, or Firm* — Weiss & Arons LLP

(57) ABSTRACT

Methods, apparatus, and systems for two-factor authentication leveraging graphical passwords and behavioral data are provided. Methods may include creating a two-factor authentication model for logging into a user account. The two-factor authentication model may include a first graphical password and first behavioral data corresponding to biometric characteristics of the creating of the graphical password. Methods may include receiving a login request from the user. Methods may include receiving, from the user, a second graphical password and second behavioral data. Methods may include identifying first comparison points between the second graphical password and the first graphical password. In parallel, methods may include identifying second comparison points between the second behavioral data and the first behavioral data. Methods may include logging the user into the account in response to a determination that a sum of the first and second comparison points is greater than a threshold value.

20 Claims, 7 Drawing Sheets

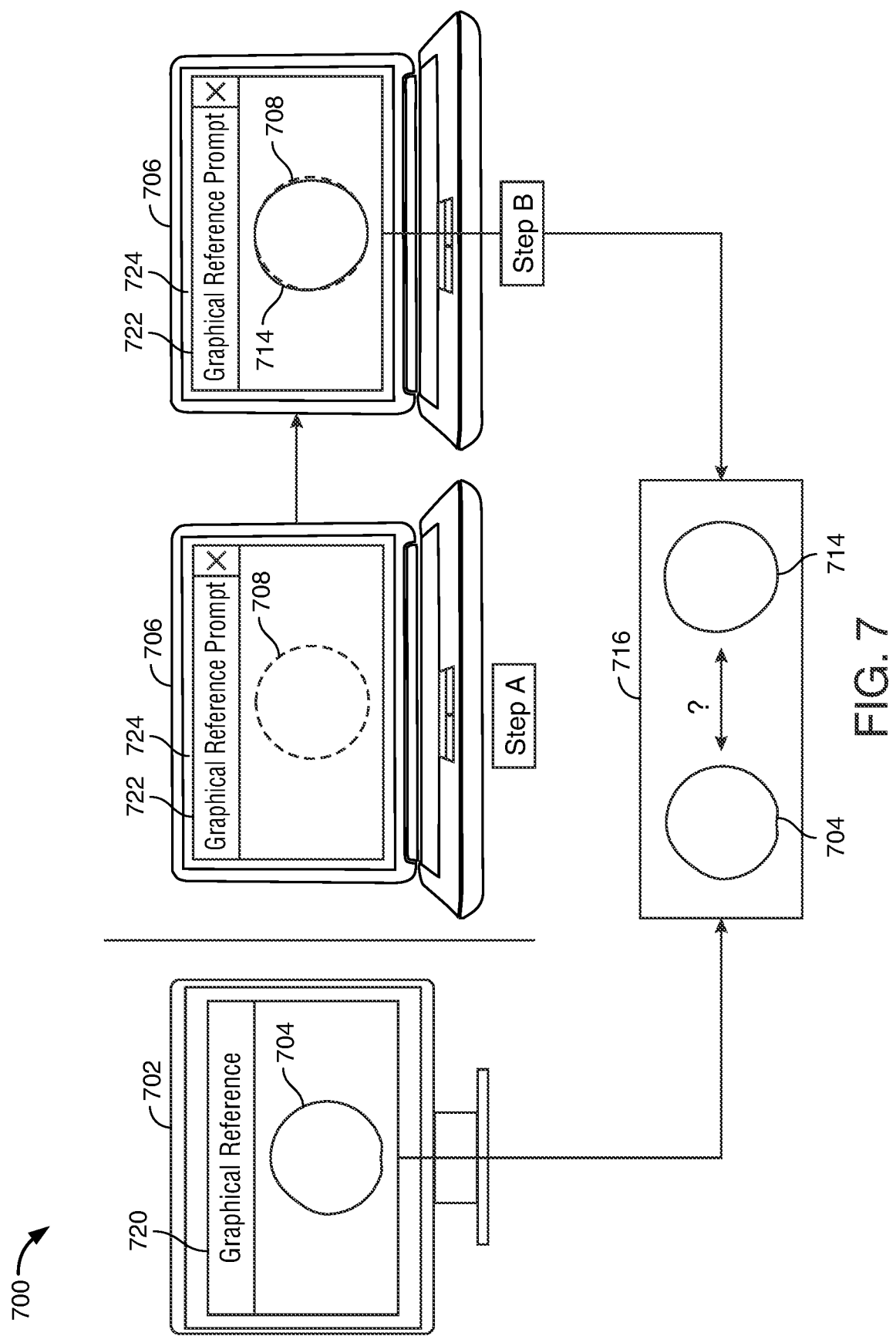

ENHANCED AUTHENTICATION LEVERAGING GRAPHICAL PASSWORDS AND BEHAVIORAL DATA

FIELD OF TECHNOLOGY

The field of technology relates to enhanced two-factor authentication.

BACKGROUND OF THE DISCLOSURE

Computing devices typically store private or sensitive information. Private or sensitive information may include information that a user does not desire to share with other users. Private or sensitive information is not secure if a non-authenticated user gains access to the computing device. Current solutions to protect private or sensitive information stored on computing devices include requiring users to input a password to gain access to the computing device.

Passwords generally include a word, a string of alphanumeric characters or a graphical image. The password is typically stored in an encrypted form on the computing device. When a user enters the password into the device, the password unlocks the device and enables the user to again access to the device and the associated private or sensitive information. Such a solution is vulnerable because a non-authenticated user may, without permission from the user, obtain the password and use the password to gain access to the computing device and the associated private or sensitive information.

In order to overcome the vulnerability of passwords, current solutions may utilize two-factor authentication. Two-factor authentication is an authentication system in which the user is granted access to the computing device upon successfully presenting two authentication factors to the authentication system. The authentication factors may include a password. However, the password may be used in combination with another factor. As such the two authentication factors limit the abilities of an unauthorized user that obtained the password. Other authentication factors include knowledge factors, possession factors, biometric factors, location factors, and time factors. Such a solution involving two-factors of authentication is cumbersome because of the two-step requirement. Such a solution is therefore time-consuming and inefficient.

As such, it would be desirable to provide a system for simultaneous two-factor authentication. It would be further desirable to provide such a system that utilizes a singular user input, the singular user input including two authentication factors.

SUMMARY OF THE DISCLOSURE

Systems, apparatus and methods for two-factor authentication of a user on a user device leveraging graphical passwords and behavioral data are provided.

Methods may include creating a two-factor authentication model. The two-factor model may be used to authenticate a user to gain access to a user account. The user account may be operating/executing on a user device. The user device may be a computing device such as a smartphone, laptop, tablet, desktop, mainframe computer and/or any other suitable computing device. The user account may be an identity/authenticator created for the user. The user account may link the user, via user credentials, to a computing service. The user credentials may include a username, a password, or any other suitable user credentials. The computing service may include an operating system executing on a computing device, such as the user device. The user account may enable the user to access user specific settings, files, and any other suitable computing customizations on the user device.

Creating the two-factor authentication model may include displaying a prompt on a graphical user interface ("GUI"). The prompt may request the user to create a first graphical password. The GUI may be displayed on and stored within the user device. A graphical password may be a password that includes user-drawn images. The user-drawn images may replace conventional alphanumeric characters. A graphical password may also be a password that includes any suitable graphic, including a user-drawn graphic and alphanumeric characters. The GUI may include an input field for receiving the first graphical password.

Methods may include capturing and storing the first graphical password created in the input field.

Methods may also include capturing and storing first behavioral data corresponding to biometric characteristics displayed/exhibited during the creation of the first graphical password.

The user device may include one or more sensors. The user device may include a screen. The screen may be a touchscreen. The screen may be a non-touchscreen. The screen, whether touchscreen or non-touchscreen, may include one or more sensors. The user device may include one or more peripheral devices, such as a mouse, a keypad, a stylus, a camera and/or any other suitable peripheral devices. The one or more peripheral devices may be connected to the user device through input/output ("I/O") modules. The one or more peripheral devices may include one or more sensors. Methods may include using the one or more sensors included in the user device, the screen, and/or the one or more peripheral devices to capture the first graphical password and first behavioral data.

When the screen is a touchscreen, behavioral data may be captured using the one or more sensors included in the touchscreen. When the screen is a non-touchscreen, the behavioral data may be captured using the one or more sensors included in the user device and/or included in the one more connected peripheral devices.

Behavioral data may include a pressure level, a velocity, a speed, a motion pattern or any other suitable biometric characteristics of the user's drawing motions. As the user draws the graphical password, the user may exhibit unique biometric characteristics. For example, biometric characteristics may include a pressure level measuring the strength of the pressure exerted by the user on the screen, the stylus, or the mouse when drawing the graphical password. Biometric characteristics may include a velocity including a deftness measurement and a smoothness measurement the user's drawing motions. Biometric characteristics may include a measurement of the speed of the user's drawing motions. Biometric characteristics may include a motion pattern of specific shapes and/or motions the user uses to draw the graphical password. Biometric characteristics may include any other suitable biometric characteristics that may be captured as the user draws the graphical password.

Methods may include creating the two-factor authentication model by storing the first graphical password as a first authentication factor and the first behavioral data as a second authentication factor.

After the creation of the two-factor authentication model, methods may include receiving a login request from the user. The login request may be initiated on the user device. In response to receiving the login request, a login prompt may be displayed on the GUI. The login prompt may include an input field operable to receive the graphical password from the user. The methods may include capturing at the input field a graphical password. Methods may also include, simultaneous to the capture of the graphical password, capturing at the input field behavioral data corresponding to the input of the graphical password.

The input graphical password may be a second graphical password. The behavioral data corresponding to the input of the second graphical password may be second behavioral data.

After the capturing of the second graphical password and the second behavioral data, methods may include initiating the two-factor authentication. The two-factor authentication may include identifying first comparison points between the second graphical password and the first graphical password. In parallel with identifying the first comparison points, the methods may include identifying second comparison points between the second behavioral data and the first behavioral data.

First comparison points may include unique identifiable features in the first graphical password that are determined to match unique identifiable features included in the second graphical password. For example, the graphical password may be a flower, comparison points may include unique identifiable features of the flower. Unique identifiable features of the flower may include a number of petals included in the flower, the shape of the petals, the size of the center of the flower and/or any other suitable unique identifiable features. The methods may include comparing the unique identifiable features of the first graphical password with unique identifiable features of the second graphical password. The unique features that are used to compare between the first graphical password to the second graphical password may be first comparison points.

The methods may include using an Artificial Intelligence ("AI") model. The AI model may compare the first graphical password to the second graphical password. The AI model may analyze the unique identifiable features of the first and second graphical passwords. The AI model may, based on the analyzation, determine whether the first graphical password matches the second graphical password. The AI model may use machine learning algorithms to compare the first and second graphical passwords.

Identification of the second comparison points may include extracting first behavioral markings from the first behavioral data and second behavior markings from the second behavioral data. Behavioral markings may include a measured pressure level, a measured velocity, a measured speed, a captured motion pattern and/or any other measured/captured biometric characteristics of the user's drawing motions.

It should be noted that behavioral data may change over time. As such, prior to comparing the first behavioral data with the second behavioral data, methods may include adjusting the first behavioral data using a dynamic time-based projection. The dynamic time-based projection may adjust the first behavioral data, to include expected changes. The expected changes may be based on a time-period that initiates with the input of the first graphical password and completed with the input of the second graphical password. The dynamic time-based projection may calculate an amount of time elapsed between the creation of the first graphical password and the input of the second graphical password. Using the calculated amount of time, the time-based projection may adjust the second behavioral data using a predetermined deterioration curve to create adjusted behavioral data. The predetermined deterioration curve may account for expected changes that may occur to the user's drawing motions.

Expected changes may include natural processes. For example, expected changes may include a decrease in user strength and coordination during time-period defined from when the user inputs the first graphical password until the user inputs the second graphical password. The user may input the second graphical password seconds, minutes, days, years etc. after the user inputs the first graphical password. Expected changes may depend on the time-period that initiates from when the user inputs the first graphical password and completes when the user inputs the second graphical password. Expected changes may include any suitable changes in biometric characteristics relating to creating the graphical password during the time-period that initiates when the user inputs the first graphical password and completes when the user inputs the second graphical password.

Adjusting of the first behavioral data may include adjusting the first behavioral markings included in the first behavioral data. The adjusting of the first behavioral markings may include adjusting the measured pressure level, the measured velocity, the measured speed, the captured motion pattern, and/or any other measured/captured biometric characteristics of the user's drawing motions. Adjusting may include adjusting the behavioral markings in accordance with the dynamic time-based projection. The adjusting may include using the AI model to adjust the behavioral markings in accordance with the dynamic time-based projection. For example, the measured pressure level stored in the two-factor authentication model may be reduced to account for a decrease in pressure as time passes from the input of the first graphical password.

The methods may include storing the adjusted first behavioral data in the two-factor authentication model. The methods may include continually adjusting the first behavioral markings.

Identifying the second comparison points may include identifying second comparison points between the second behavioral markings and the adjusted behavioral markings. Second comparison points may include unique identifiable markings in the adjusted behavioral data that are determined to match unique identifiable markings included in the second behavioral data. The methods may include comparing the unique identifiable markings of the adjusted behavioral data with unique identifiable markings of the second behavioral data. The unique markings that are determined to match between the adjusted behavioral data and the second behavioral data may be second comparison points.

The methods may include using the AI model to compare the adjusted behavioral markings with the second behavioral markings. The AI model may analyze the unique identifiable markings of the adjusted and second behavioral markings and determine whether they are a match. The AI model may use machine learning algorithms to compare the adjusted behavioral data to the second behavioral data.

The methods may include determining a sum of a number of the first and second comparison points. The methods may include determining that the sum of the number of the first and second comparison points is greater than, or equal to, a threshold value. The threshold value may be a predetermined threshold value. The threshold value may be a numerical value. The threshold value may be a percentage such as 5%, 10%, etc. The threshold value may be a decimal number such as, 0.1, 0.2, 0.3 etc. The threshold value may be a whole number such as 1, 2 and 3 etc. The predetermined threshold value may be a minimum sum needed in order to log the user into the user account.

The methods may include logging the user into the user account in response to a determination that the sum of the first and second comparison points is determined to be greater than, or equal to, the threshold value. The threshold value may provide for a margin of error for the comparison between the first and second graphical passwords and behavioral data to account for variations that may occur when the user inputs the second graphical password.

The methods may include adapting the two-factor authentication model. The adapting of the two-factor authentication model may include logging in a data log each user login attempt. The dynamic adapting of the two-factor authentication model may include logging in a data log a graphical password created during each login attempt. The dynamic adapting of the two-factor authentication model may include logging in a data log behavioral data corresponding to biometric characteristics captured from the creating of each graphical password. The methods may include storing the data log at a database associated with the user device. The methods may include storing the data log at any suitable memory location associated with the user device.

The methods may include predicting, using the data log, projected changes for a subsequent creation of a subsequent graphical password. Projected changes may include subtle changes in the graphical password. Subtle changes may include changes that are less than a threshold percentage of change. For example, the graphical password may be a flower, subtle changes in the flower may include petals that are narrower than the petals created in the first graphical password. Other subtle changes may include a flower that is larger than the flower created in the first graphical password. Subtle changes may be any suitable changes that do not change the substance of the graphical password. Subtle changes may be any suitable changes in which the subsequent graphical password appears substantially the same as the first graphical password.

When the user inputs a subsequent graphical password, the methods may include determining whether the subsequent graphical password is similar over a threshold level of similarity to the projected changes mapped on to the first graphical password. The subsequent graphical password may include at least one character change from the first graphical password. The character change may be a subtle change. In response to determining that the character change is similar over a threshold level of similarity to the projected changes mapped on to the first graphical password, the methods may include logging the user into the user account. In response to determining that the character change is not similar over a threshold level of similarity to the projected changes mapped on to the first graphical password, the methods may include preventing the user from logging into the user account.

The user device may be a first user device. The methods may include receiving a second login request at a second user device. In response to receiving the second login request, methods may include displaying, on a second graphical user interface, a prompt. The prompt may request the user to input a graphical reference. The second graphical user interface may be included in the second user device. The graphical reference may be a predetermined graphical reference. The graphical reference may be a shape, drawing and/or any other suitable graphic preselected by the user to use as a graphical reference. The prompt may include an outline of the graphical reference. Methods may include capturing the user tracing the outline of the graphical reference on the second user device.

The methods may include comparing the graphical reference traced on the second user device to a stored traced graphical reference from the first user device. The methods may include identifying first characteristics related to the first user device and second characteristics related to the second user device. The first and second characteristics may be identified based on a comparison between the graphical reference traced on the second user device and the stored traced graphical reference from the first user device. The methods may include using the identified first and second characteristics to distinguish between the first and second user devices.

The first and second characteristics may be attributed to physical differences between the first and second user devices. For example, one user device may be a desktop computer and one user device may be a laptop computer. A desktop computer may accept more pressure than a laptop or other user device.

The first characteristics may be characteristics such as calibration, pressure sensitivity and any other suitable characteristics of the first user device. The second characteristics may be characteristics such as calibration, pressure sensitivity and any other suitable characteristics of the second user device. Characteristics such as calibration, pressure sensitivity and any other suitable characteristics may affect the user's drawing motions. The methods may include using the graphical reference to identify the first and second characteristics. The methods may include using the first and second characteristics to distinguish between calibration and pressure sensitivity of the first and second user devices. The methods may include using the first and second characteristics to distinguish between the first and second user devices.

In some embodiments, the methods may include initiating the two-factor authentication as the user inputs the second graphical password. The methods may include determining that more than a predetermined percentage of the graphical password has been input. The methods may include determining that a sum of a number of the first and second comparison points are greater than a threshold value. The methods may include logging the user into the account in response to a determination that both more than a predetermined percentage of the graphical password has been input and the sum of the first and second comparison points is greater than the threshold value.

In an example, a graphical password may be a six-pointed star and the predetermined percentage may be 50% of the star. As the user begins to input the graphical password, the two-factor authentication may capture the graphical password being drawn and the behavioral data associated with the user's drawing motions. The two-factor authentication scan may capture the user's drawing motions until 50% of the graphical password has been input. In response to a detection that three of the six points of the star have been input and the behavioral data associated with the input of the three points correspond to the stored two-factor authentication model within a predetermined error margin, determined by a threshold value, the user may be logged into the user account.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which:

FIG. 7 shows yet another illustrative diagram in accordance with principles of the disclosure.

DETAILED DESCRIPTION OF THE DISCLOSURE

Figure 1:
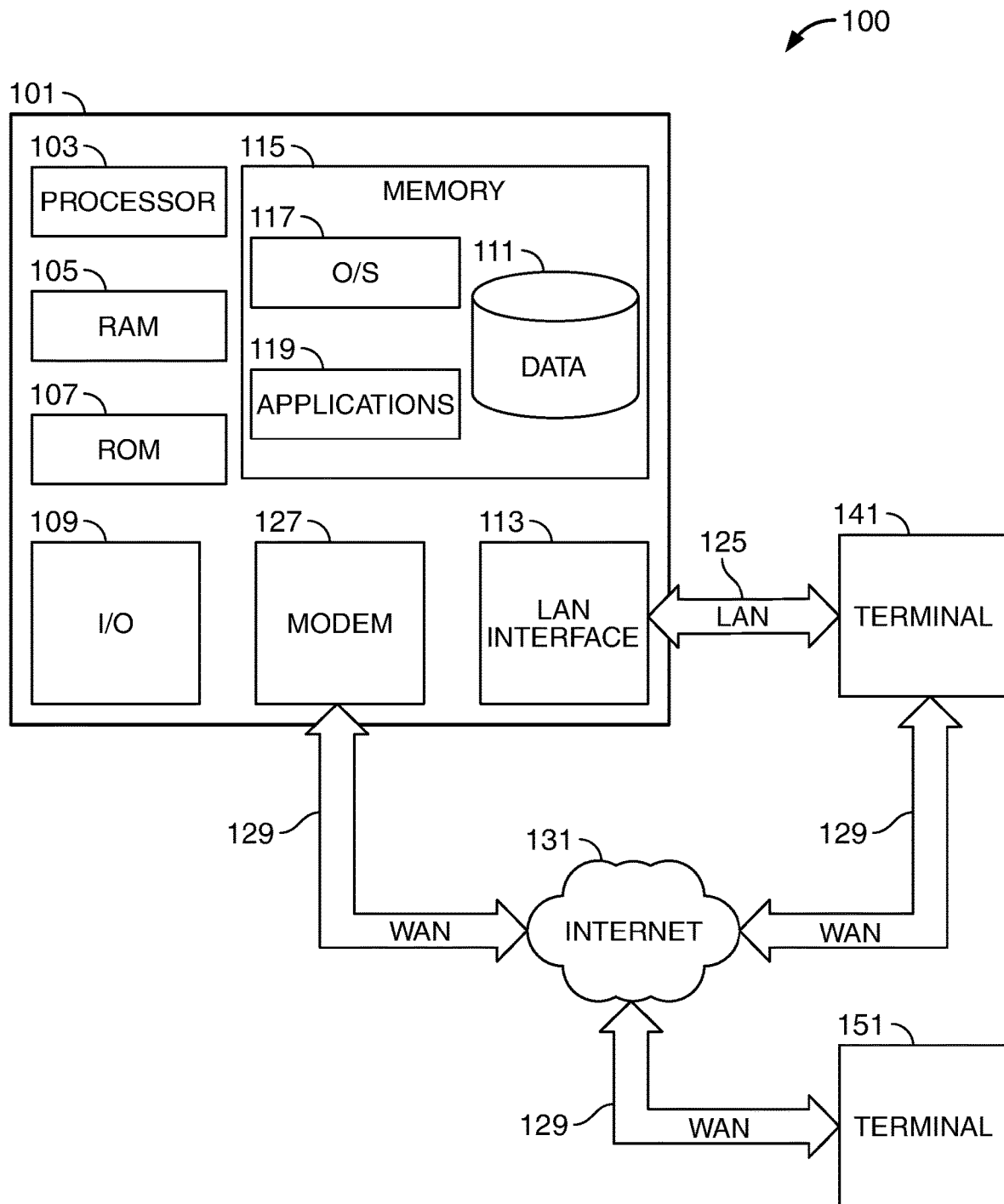
FIG. 1 shows an illustrative diagram in accordance with principles of the disclosure.

Apparatus, methods and systems for two-factor authentication of a user on a user device leveraging graphical passwords and behavioral data are provided.

The apparatus may include a processor. The processor may include hardware. The processor may include software. The processor may include any combination of hardware and software. The processor may be included in the user device. The user device may be a computing device. The user device may be a desktop, laptop, tablet, smartphone, mainframe computer or any other suitable computing devices. The user device may include a screen. The screen may be a touchscreen. The screen may be a non-touchscreen. The screen may be any suitable computing device screen. The screen may be in electronic communication with the processor.

The user device may include a graphical user-interface ("GUI"). The GUI may be in electronic communication with the processor. The user may input an account creation request in the user device. The user account may be an identity/authenticator created for the user. The user account may link the user, via user credentials, to a computing service. The user credentials may include a username, a password, or any other suitable user credentials. The computing service may include an operating system executing on a computing device, such as the user device. The user account may enable the user to access user specific settings, files, and any other suitable computing customizations on the user device.

In response to an account creation request, the GUI may display a prompt requesting the user to create a first graphical password. The GUI may display an input field in the prompt for receiving the first graphical password from the user. A graphical password may be any suitable graphic, image or shape that the user may recreate in order to access the user account.

The user device may include one or more sensors. The one or more sensors may include pressure sensors, optical sensors, capacitive sensors, touch sensors, ultrasonic sensors, infrared sensors, force sensors or any other suitable types of sensors. The one or more sensors may be in electronic communication with the processor. When the screen is a touchscreen, the one or more sensors may be included in the screen. When the screen is a non-touchscreen, the one or more sensors may be included in peripheral devices connected to the user device. The peripheral devices may include a mouse, a stylus, a camera, a keypad and/or any other suitable peripheral devices. Whether the screen is a touchscreen or a non-touchscreen, the sensors may be included in any components of the user device suitable to capture the creation of the graphical password. The one or more sensors may capture from the input field the first graphical password. The one or more sensors may capture first behavioral data corresponding to biometric characteristics of the user when the user creates the first graphical password.

The processor may run an authentication service. The authentication service may create a two-factor authentication model for logging the user into the user account on the user device. The authentication service may store the first graphical password as a first authentication factor and the first behavioral data as a second authentication factor. The authentication may store the first graphical password and the first behavioral data at a memory location electronically connected to the user device. The memory location may be a database, a read-only-memory ("ROM"), a random-access-memory ("RAM"), cache memory, a central repository or any other suitable memory location. The authentication service may determine at which memory location to store the first graphical password and the first behavioral data.

The processor may initiate a two-factor authentication scan in response to receiving a login request from the user. The one or more sensors may capture an input graphical password from the user. The one or more sensors may capture behavioral data corresponding to the input of the graphical password by the user. The input graphical password may be a second graphical password. The behavioral data corresponding to the input of the graphical password may be second behavioral data.

After the capture of the second graphical password and the second behavioral data, the processor may use an artificial intelligence ("AI") model to identify first comparison points between the second graphical password and the first graphical password. In parallel with the identification of the first comparison points, the processor may use the AI model to identify second comparison points between the second behavioral data and the first behavioral data.

When identifying the second comparison points, the AI model may extract first behavioral markings from the first behavioral data and second behavioral markings from the second behavioral data. The AI model may adjust the first behavioral markings using a dynamic time-based projection. The dynamic time-based projection may be used to adjust for expected changes in the behavioral data. The expected changes may occur as a result of changes in user behavioral data from a time-period that initiates when the user inputs the first graphical password and completes when the user inputs the second graphical password.

Expected changes in user behavioral data may include a decrease in user strength and coordination during the period that initiates when the user inputs the first graphical password and completes when the user inputs the second graphical password. The first behavioral markings may include a captured pressure level, a captured velocity, a captured speed, or a captured motion pattern of the user's drawing motions identified when the user created the first graphical password. The processor may adjust the first behavioral markings by adjusting the captured pressure level, the captured velocity, the captured speed, or the captured motion pattern of the user's drawing motions included in the first behavioral data. The second behavioral markings may include to a captured pressure level, a captured velocity, a captured speed, or a captured motion pattern of the user's drawing motions when the user inputs the second graphical password. The AI model may identify the second comparison points between the second behavioral markings and the adjusted behavioral markings.

The processor may determine that a sum of a number of the first and second comparison points is greater than, or equal to, a threshold value. In response to determining that the sum of the first and second comparison points is greater than a threshold value, the processor may login the user into the user account.

For example, the graphical password may be a five-pointed star. The user may recreate the five-pointed star to access the user account. As the user recreates the five-pointed star, the processor may compare the recreated five-pointed star to the five-pointed star stored in the two-factor authentication model. The user may have a specific method to draw the five-pointed star. The specific method to draw the five-pointed star may be included in the behavioral data. As the user recreates the five-pointed star, the processor may compare the behavioral data of the recreating of the five-pointed star to the behavioral data stored in the two-factor authentication model. However, because the specific method a user draws is prone to change over time, the processor may first adjust the behavioral data stored in the two-factor authentication model. The processor may adjust the behavioral data based on a projection based on a normal rate of change of the user's drawing motions. The processor may then the compare the adjusted behavioral data with the behavioral data associated with the input of the five-pointed star.

The five-pointed star may include key features, such as the shape of the points, the distance between points and any other suitable features. Comparison of the recreated five-pointed star to the stored five-pointed star may include identifying comparison points between the key features. Comparison points may be unique identifiers that are determined to match between two pieces of data being compared. Behavioral data may include a pressure level, a velocity, a speed, or a motion pattern of the user's drawing motions. Comparison of the behavioral data associated with the recreating of the five-pointed star to the adjusted behavioral data may include identifying comparison points between the pressure level, the velocity, the speed, or the motion pattern of the user's drawing motions.

In order to enable the user to login to the user account, the sum of the comparison points from the comparison of the graphical passwords and from the comparison of the behavioral data may be greater than, or equal to, the threshold value. The threshold value may enable an error margin that may account for natural variability, such as tiredness of the user, environmental conditions of where the user device is located, or any other suitable variabilities. The threshold value may be a predetermined threshold value. The threshold value may be a numerical value. The threshold value may be a percentage such as 5%, 10%, etc. The threshold value may be a decimal number such as, 0.1, 0.2, 0.3 etc. The threshold value may be whole number such as 1, 2 and 3 etc. The threshold value may be a minimum sum needed in order to log the user into the user account.

The processor may log in a data log each user login attempt. The processor may log in a data log a graphical password created during each login attempt. The processor may log in a data log behavioral data corresponding to biometric characteristics captured during the creating of each graphical password. The processor may use the AI model to predict, using the data log, projected changes for a creation of a subsequent graphical password. When the user inputs the subsequent graphical password, the processor may determine if the subsequent graphical password is similar, over a threshold level of similarity, to the projected changes mapped on the first graphical password.

The subsequent graphical password may include at least one character change from the first graphical password. For example, the graphical password may be a five-pointed star. As the user keeps entering the five-pointed star, the points of the star may narrow. Based on the data log, the processor may calculate an approximate amount by which the points of the star are predicted to narrow for each subsequent input of the graphical password. The processor may save the approximate amount by which the points of the star are predicted to narrow as the projected changes. The processor may map each subsequent input of the graphical password on the projected changes. The processor may update the two-factor authentication model based on the projected changes. The processor may dynamically calculate and update the projected changes based on the data log.

The user device may be a first user device. When the user device is a first user device, the apparatus may include a second user device. The second device may include a second processor. The second device may be in electronic communication with the first user device. The second user device may be in electronic communication with the memory location of the first user device. The second user device may be a user device that is a different device from the first user device. The second device may be configured to receive a second login request. In response to receipt of the second login request the second user device may display, on a second GUI, a prompt requesting the user to input a graphical reference. The prompt may include an outline of the graphical reference.

The graphical reference may be a predetermined shape or graphic preselected by the user. The graphical reference may be used to differentiate between the first user device and the second user device.

The second processor may compare the graphical reference traced on the second user device to a graphical reference traced on the first user device. The graphical reference traced on the first user device may be stored at the memory location. Based on the comparison, the second processor may identify first characteristics related to the first user device and second characteristics related to the second user device. The second processor may use the first and second characteristics to distinguish between the first and second user devices. The second processor may transmit the first and second characteristics to the first processor. The first processor may use the first and second characteristics to distinguish between the first and second user devices.

The first and second characteristics may be attributed to physical differences between the first and second user devices. For example, one user device may be a desktop computer and one user device may be a laptop computer. The first characteristics may be characteristics such as calibration, pressure sensitivity and any other suitable characteristics of the first user device. The second characteristics may be characteristics such as calibration, pressure sensitivity and any other suitable characteristics of the second user device. Characteristics such as calibration, pressure sensitivity and any other suitable characteristics may affect the user's drawing motions. The first and second processors may use the graphical reference to identify the first and second characteristics. The first and second processors may use the first and second characteristics to distinguish between calibration and pressure sensitivity of the first and second user devices.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the computing devices, sensors, artificial intelligence ("AI") models, and any other part of the disclosure may include some or all of apparatus included in system 100.

Computer 101 may have a processor 103 for controlling the operation of the device and its associated components and may include Random Access Memory ("RAM") 105, Read Only Memory ("ROM") 107, input/output circuit 109 and a non-transitory or non-volatile memory 115. Machine-readable memory may be configured to store information in machine-readable data structures. The processor 103 may also execute all software executing on the computer—e.g., the operating system and/or voice recognition software.

Other components commonly used for computers, such as EEPROM or Flash memory or any other suitable components, may also be part of the computer 101.

Memory 115 may be comprised of any suitable permanent storage technology—e.g., a hard drive. Memory 115 may be comprised of cloud-based storage technology. Memory 115 may store software including the operating system 117 and application(s) 119 along with any data 111 needed for the operation of the system 100. Memory 115 may also store videos, text and/or audio assistance files. Computing devices, sensors, AI models, databases, and any other suitable computing devices as disclosed herein may have one or more features in common with Memory 115. The data stored in Memory 115 may also be stored in cache memory, or any other suitable memory.

Input/output ("I/O") module 109 may include connectivity to a microphone, keyboard, touchscreen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, Wi-Fi, cellular networks or other suitable frequencies.

It will be appreciated if the network connections shown are illustrative and other means of establishing a communications link between computers may be used. The existence of various well-known protocols such as TCP/IP, Ethernet, FTP, HTTP, Bluetooth, Wi-Fi and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS"), instant messaging service ("IM") and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
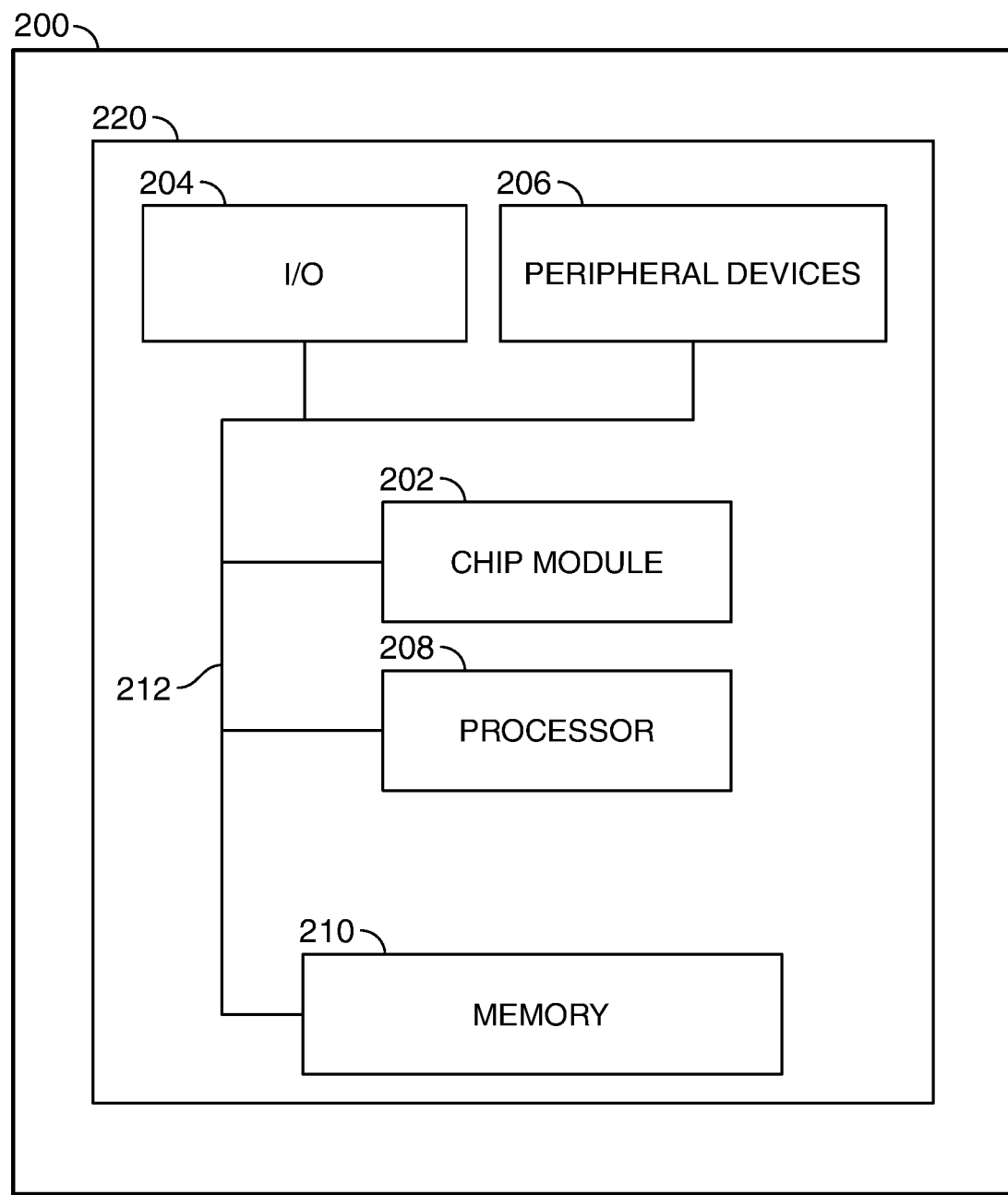
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
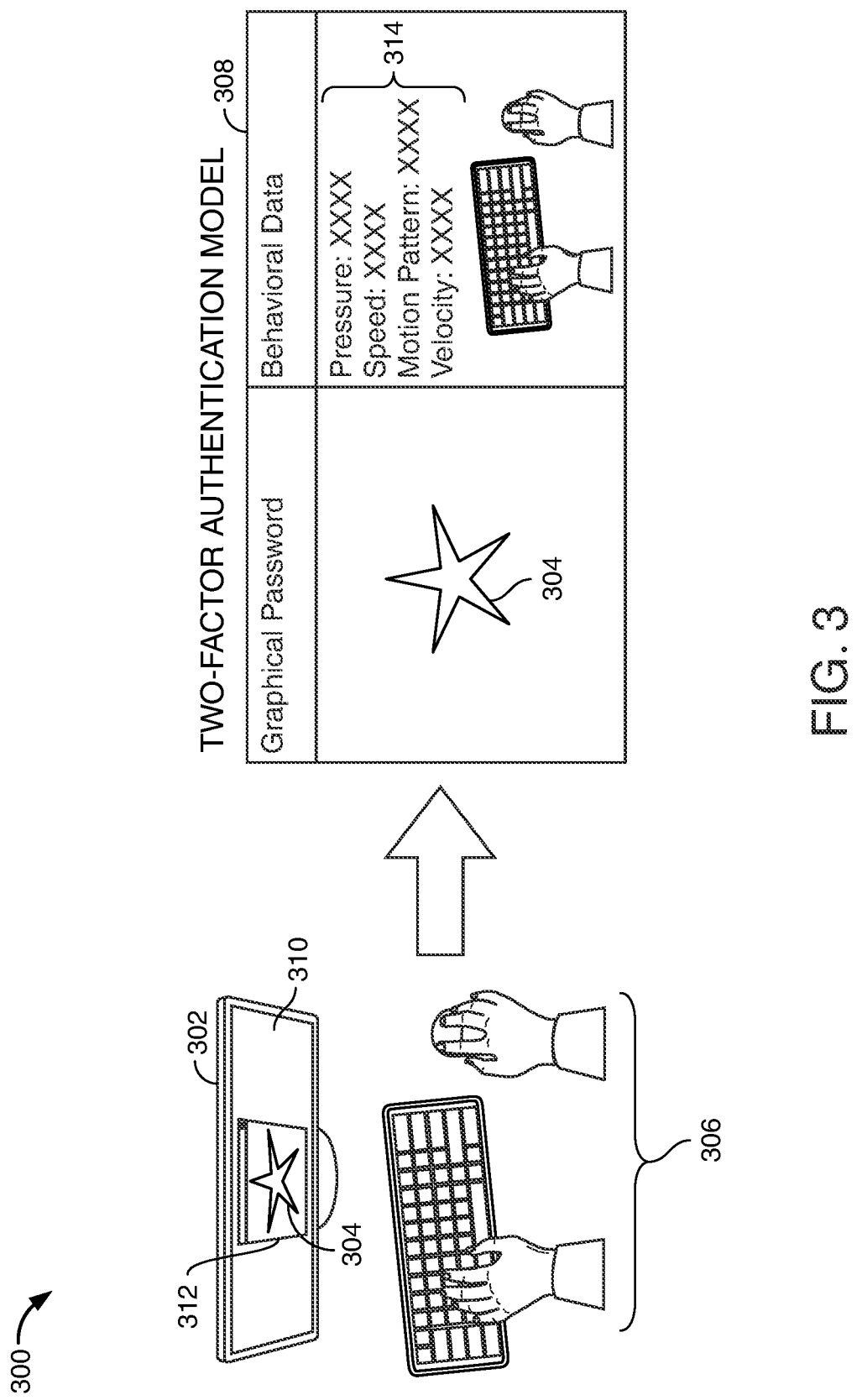
FIG. 3 shows yet another illustrative diagram in accordance with principles of the disclosure.

FIG. 3 shows graphical password creation process 300. User 306 may input a create account request at user device 302. User device 302 may be a laptop, smartphone, desktop computer, tablet, mainframe computer and/or any other suitable computing device. In response to receiving the create account request, user device 302 may create two-factor authentication model 308. User device 302 may include graphical user interface ("GUI") 310.

User device 302 may receive a login request from user 306. After receiving a login request, user device 302 may display prompt 312 on GUI 310. Prompt 312 may request user 306 to input a graphical password. Prompt 312 may include an input field to accept the graphical password. User 306 may input graphical password 304 into the input field. When user device 302 includes a touchscreen, user 306 may input graphical password 304 by drawing it on GUI 310. When user device 302 does not include a touchscreen, user 306 may input graphical password 304 using any peripheral device connected to user device 302. Examples of a peripheral device may include a mouse, a stylus, a camera, a keypad and/or any other suitable peripheral device.

User device 302 may include one or more sensors (not shown). The one or more sensors may be configured to capture behavioral data 314 as user 306 inputs graphical password 304. Behavioral data 314 may include pressure, speed, motion pattern, velocity, and any other suitable measure drawings motions of user 306. User device 302 may store graphical password 304 and behavioral data 314 in two-factor authentication model 308. Two-factor authentication model 308 may be stored in a memory location associated with user device 302. Upon, and/or simultaneous to, storing two-factor authentication model 308 in the memory location, user device 302 may create an account for user 306. User 306 may access the account with a correct input of graphical password 304.

Figure 4:
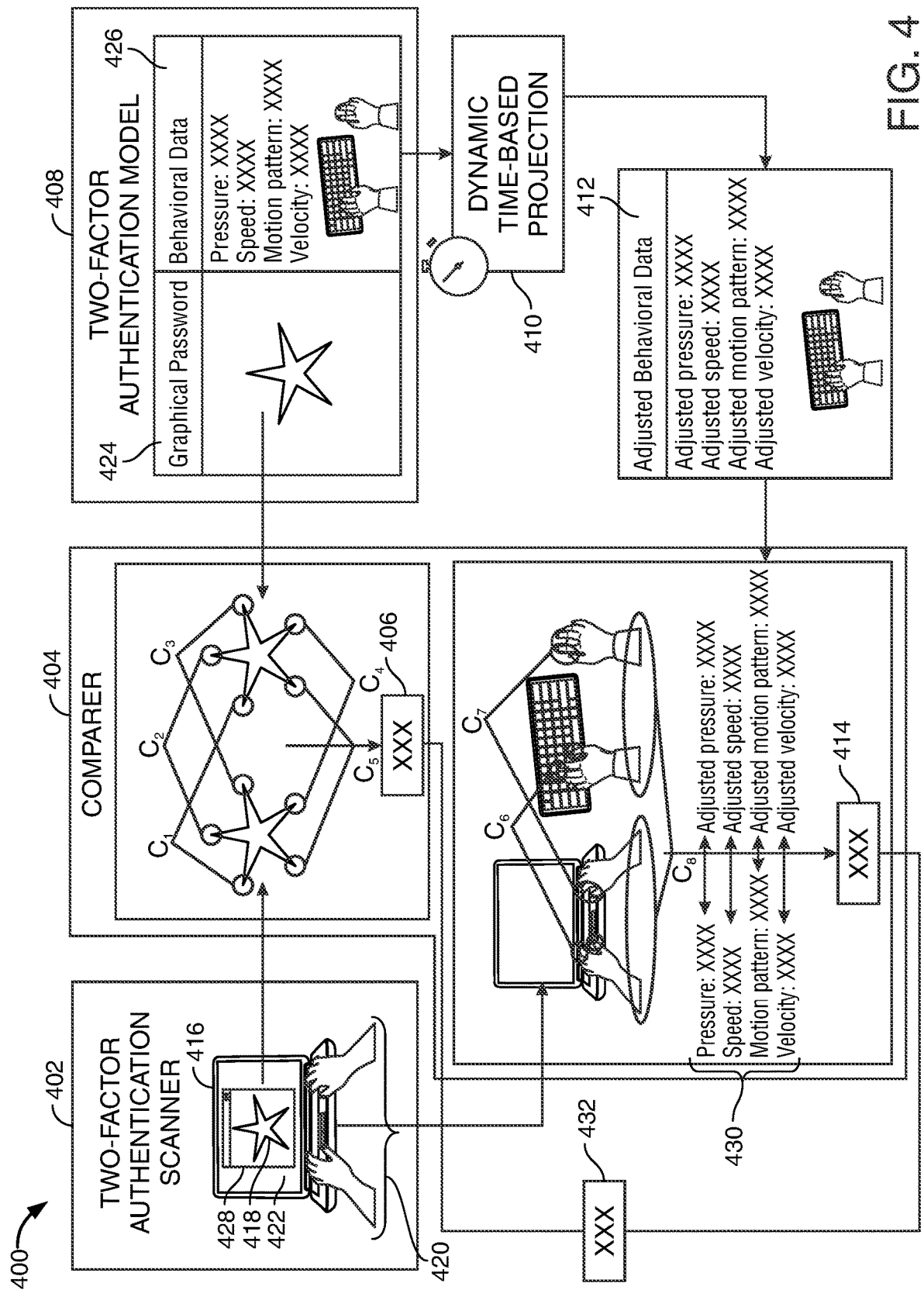
FIG. 4 shows yet another illustrative diagram in accordance with principles of the disclosure.

FIG. 4 shows illustrative two-factor authentication scan 400. In response to receiving a login request from user 420, user device 416 may display prompt 428 on GUI 422. Prompt 428 may include an input field for receiving a graphical password to authenticate user 420. User 420 may input graphical password 418 into the input field. In response to detecting an input of graphical password 418, user device 416 may initiate two-factor authentication scanner 402. User device 416 may include one or more sensors. During two-factor authentication scan 400 the one or more sensors may capture the input of graphical password 418. During two-factor authentication scan 400, the one or more sensors may capture behavioral data 430. Behavioral data 430 may include biometric characteristics associated with the input of graphical password 418.

As user 420 inputs graphical password 418, two-factor authentication scanner 402 may initiate comparer 404. Comparer 404 may compare graphical password 418 with graphical password 424. Graphical password 424 may be stored in two-factor authentication model 408. Two-factor authentication model 408 may be created and stored when user 420 creates a user account. Two-factor authentication model 408 may have one or more features in common with two-factor authentication model 308. Comparer 404 may compare behavioral data 430 with behavioral data 426. Behavioral data 426 may be stored in two-factor authentication model 408.

Comparer 404 may use an AI model (not shown) to identify comparison points between graphical password 418 and graphical password 424, such as comparison points $C_1$, $C_2$, $C_3$, $C_4$ and $C_5$. Comparison points $C_1$, $C_2$, $C_3$, $C_4$ and $C_5$ may include unique identifiers that are determined to match between graphical password 418 and graphical password 424. Comparer 404 may calculate sum of comparison points 406. Sum of comparison points 406 may be a percentage of graphical password 418 that is determined to match graphical password 424.

Prior to comparing behavioral data 430 with behavioral data 426, two-factor authentication scanner 402 may adjust behavioral data 426. Over time, a user's drawing capabilities and coordination may deteriorate. A user's drawing capabilities and coordination may deteriorate based on natural world processes. Two-factor authentication scanner 402 may adjust behavioral data 426 to account for the deterioration of a user's drawing capabilities and coordination using dynamic time-based projection 410. Dynamic time-based projection 410 may calculate an amount of time that elapsed between the creation of two-factor authentication model 408 and the input of graphical password 418. Using the calculated amount of time, dynamic time-based projection 410 may adjust behavioral data 426 using a predetermined deterioration curve to create adjusted behavioral data 412. The predetermined deterioration curve may be calculated by using the AI model (not shown). The predetermined deterioration curve may track a user's drawing motions over a time-period. The predetermined deterioration curve may be a preset deterioration curve. Dynamic time-based projection 410 may adjust behavioral data 426 using any suitable means to create adjusted behavioral data 412.

After adjusting behavioral data 426, comparer 404 may use the AI model (not shown) to compare adjusted behavioral data 412 to behavioral data 430. Comparer 404 may identify comparison points between adjusted behavioral data 412 and behavioral data 430, such as comparison points $C_6$, $C_7$ and $C_8$. Comparison points $C_6$, $C_7$ and $C_8$, may include unique behavioral markings that are determined to match between adjusted behavioral data 412 and behavioral data 430. Comparer 404 may calculate sum of comparison points 414. Sum of comparison points 414 may be a percentage of adjusted behavioral data 412 that is determined to match behavioral data 430.

Comparer 404 may calculate total comparison score 432 by combining sum of comparison points 406 and sum of comparison points 414. Total comparison score 432 may be a percentage of graphical password 418 and behavioral data 430 that is determined to match graphical password 424 and adjusted behavioral data 412. Two-factor authentication scanner 402 may determine whether total comparison score 432 is greater than or equal to a threshold value.

In response to determining that total comparison score 432 is greater than, or equal to, the threshold value, two-factor authentication scanner 402 may enable user 420 to login into the user account.

Figure 5:
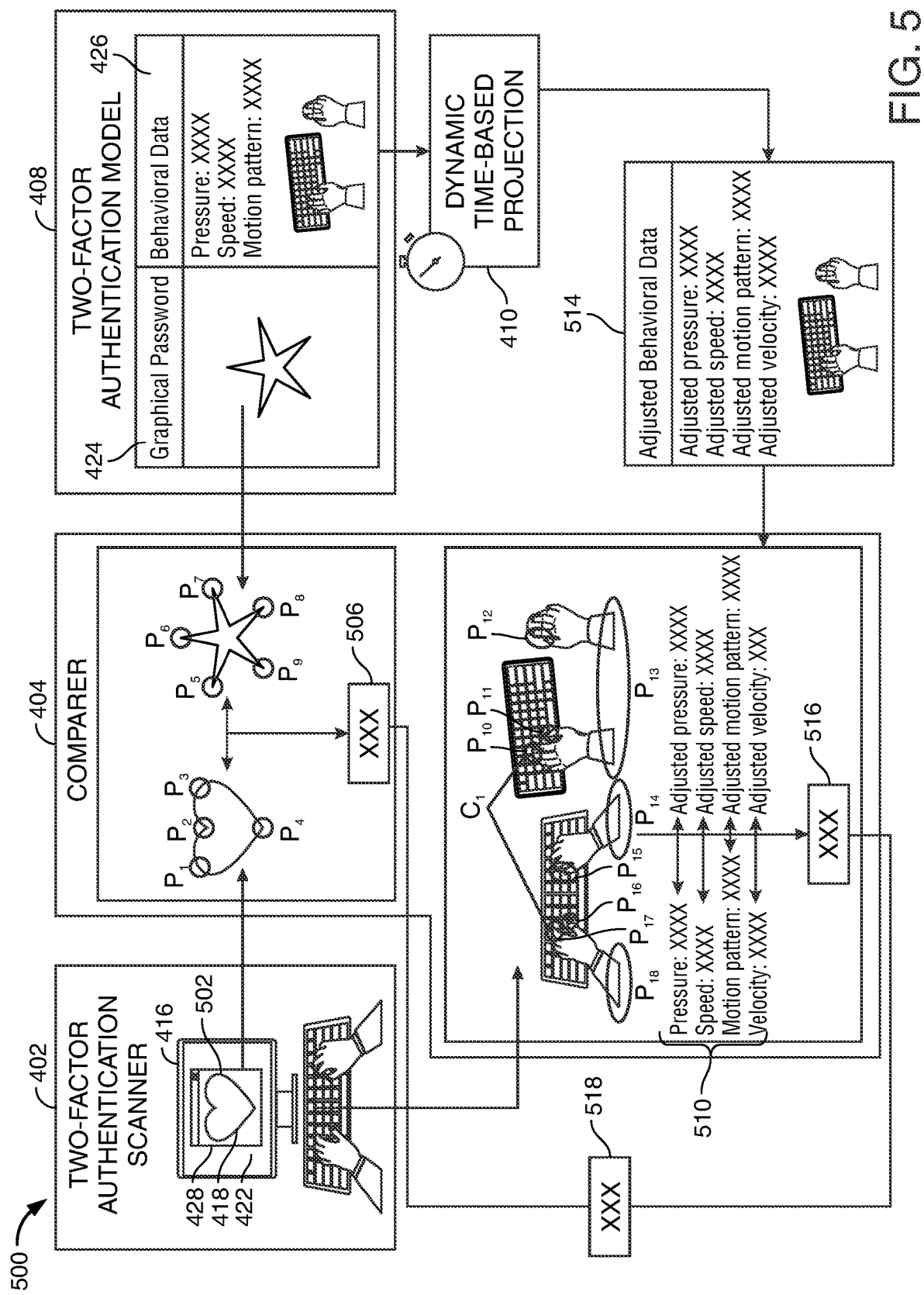
FIG. 5 shows yet another illustrative diagram in accordance with principles of the disclosure.

FIG. 5 shows two-factor authentication scan 500. Two-factor authentication scan 500 may be an iteration of two-factor authentication scan 400. In response to receiving a login request from a user, user device 416 may display prompt 428 on GUI 422. A user may input graphical password 502 in an input field of prompt 428. As the user inputs graphical password 502, two-factor authentication scanner 402 may capture graphical password 502. In response to capturing graphical password 502, the one or more sensors may capture behavioral data 510. Behavioral data 510 may include biometric characteristics associated with the input of graphical password 502.

As the user inputs graphical password 502, two-factor authentication scanner 402 may initiate comparer 404. Comparer 404 may be used to determine whether the user that input graphical password 502 is user 420. Comparer 404 may compare graphical password 502 with graphical password 424. Comparer 404 may compare behavioral data 510 with behavioral data 426.

Comparer 404 may identify points of interest in graphical password 502 and graphical password 424. Points of interest may be identifiable features that may be used to determine if there are comparison points between graphical password 502 and graphical password 424. Comparer 404 may identify points of interest $P_1$, $P_2$, $P_3$ and $P_4$, in graphical password 502. Comparer 404 may identify points of interest $P_5$, $P_6$, $P_7$, $P_8$ and $P_9$, in graphical password 424. Comparer 404 may identify whether any points of interest, included in graphical password 502, match any points of interest included in graphical password 424. Comparer 404 may calculate sum of comparison points 506. Sum of comparison points 506 may reflect a number of comparison points identified between graphical password 502 and graphical password 424. Comparer 404 may calculate a sum when no points of interest match. As such the calculated sum me be equivalent to zero.

Prior to comparing behavioral data 510 with behavioral data 426, two-factor authentication scanner 402 may adjust behavioral data 426. Dynamic time-based projection 410 may calculate an amount of time between the creation of two-factor authentication model 408 and the input of graphical password 502. Using the calculated amount of time, dynamic time-based projection 410 may adjust behavioral data 426. Dynamic time-based projection 410 may adjust behavioral data 426 using the predetermined deterioration curve to create adjusted behavioral data 514.

After adjusting behavioral data 426, comparer 404 may compare adjusted behavioral data 514 to behavioral data 510. Comparer 404 may identify points of interest $P_{14}$, $P_{15}$, $P_{16}$, $P_{17}$ and $P_{18}$ in behavioral data 510. Comparer 404 may identify points of interest $P_{10}$, $P_{11}$, $P_{12}$, and $P_{13}$ in behavioral data 514. Comparer 404 may identify whether any points of interest included in behavioral data 510 are determined to match adjusted behavioral data 514. Comparer 404 may identify comparison point $C_1$. Comparison point $C_1$ may indicate a match between two points of interest. Comparer 404 may calculate sum of comparison points 516. Sum of comparison points 516 may reflect a number of comparison points identified between behavioral data 510 and adjusted behavioral data 514.

Comparer 404 may calculate total comparison score 518 by combining sum of comparison points 506 and sum of comparison points 516. Total comparison score 518 may be a percentage of graphical password 502 and behavioral data 510 that is determined to match graphical password 424 and adjusted behavioral data 514. Two-factor authentication scanner 402 may determine whether total comparison score 518 is greater than or equal to a threshold value.

In response to determining that total comparison score 518 is less than the threshold value, two-factor authentication scanner 402 may identify that the user is not user 420. In response to identifying that the user is not user 420, user login may be terminated.

Figure 6:
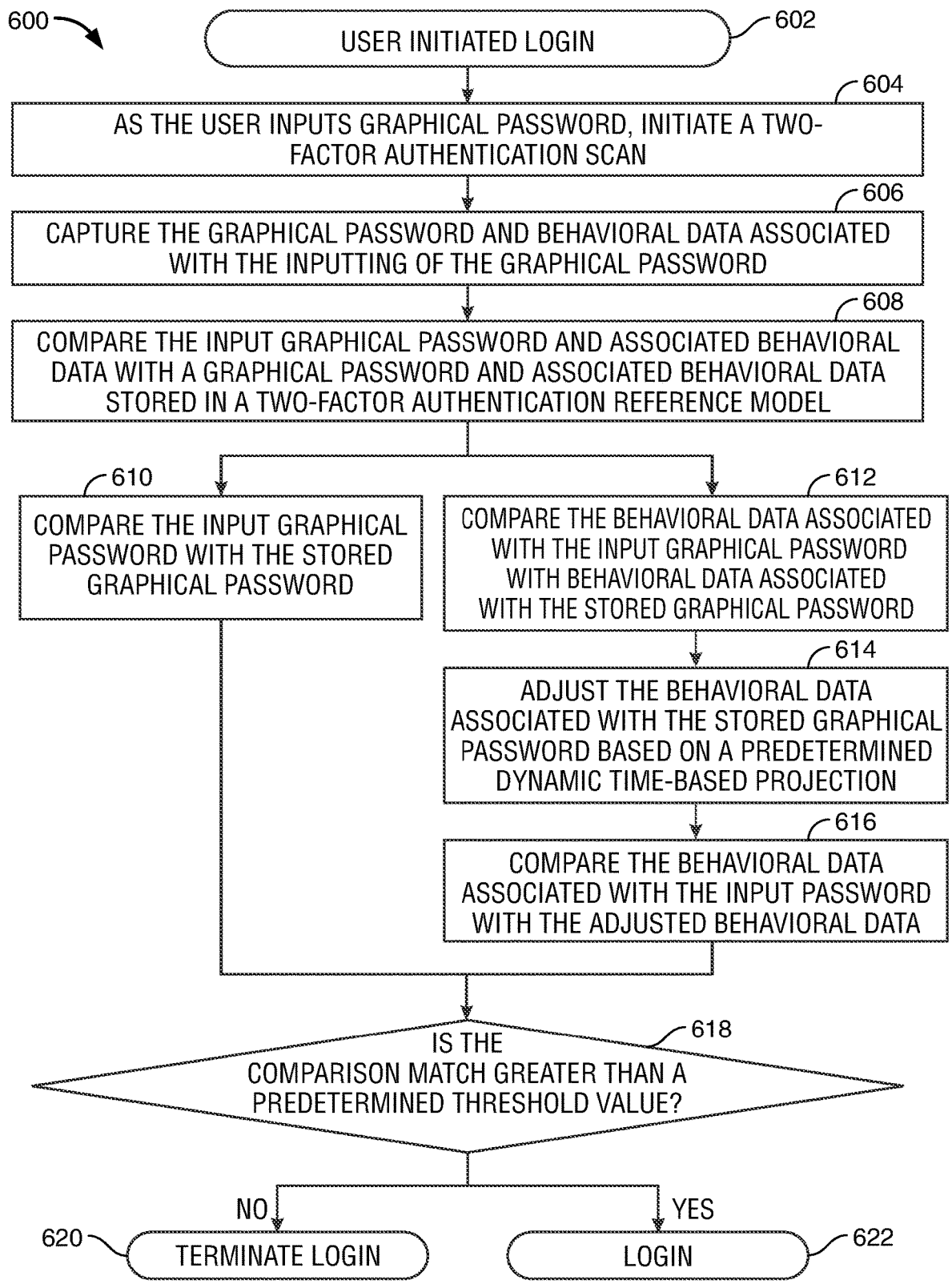
FIG. 6 shows yet another illustrative diagram in accordance with principles of the disclosure.

FIG. 6 shows illustrative diagram 600. At step 602, a user may initiate a login. The user may input a graphical password to initiate the login. At step 604, a two-factor authentication scan may be initiated. The two-factor authentication scan may be initiated as the user inputs the graphical password. The two-factor authentication scan may have one or more features in common with two-factor authentication scan 400. At step 606, the graphical password may be captured as part of the two-factor authentication scan. Additionally, behavioral data associated with biometric characteristics of the input of the graphical password may be captured. At step 608 the input graphical password and associated behavioral data may be compared to a graphical password and associated behavioral data. The graphical password and associated behavioral data may be stored in a two-factor authentication model relating to the user.

At step 610, the input graphical password may be compared to the stored graphical password. In parallel, at step 612 the behavioral data associated with the input graphical password may be compared to the behavioral data associated with the stored graphical password. At step 614, the behavioral data associated with the stored graphical password may be adjusted based on a dynamic time-based projection to account for deterioration of the user's drawing capabilities. At step 616, the behavioral data associated with the input of the graphical password may be compared to the adjusted behavioral data.

At step 618, a comparison percentage may be calculated based on the percentage of the graphical passwords and associated behavioral data that are determined to match. The comparison percentage may be compared to a threshold value. The threshold value may be a minimum percentage value that is needed to enable a user login. In response to a determination that the comparison percentage is greater than, or equal to, the threshold value, the login may be enabled at step 622. In response to a determination that the comparison percentage is less than the threshold value, the login may be terminated at step 620.

FIG. 7 shows user device comparison 700. In response to receiving a second user login on second user device 706, graphical reference prompt 722 may be displayed on GUI 724. Second user device 706 may be a laptop, smartphone, desktop computer, tablet, mainframe computer or any other suitable computing device. Second user device 706 may be a computing device that is different from first user device 702.

Graphical reference prompt 722 may include traceable graphical reference 708. Traceable graphical reference 708 may be a preselected graphic. Traceable graphical reference 708 may include a traceable outline of a user-selected graphic. In response to the displaying of graphical reference prompt 722, a user may input trace 714 of traceable graphical reference 708. In response to receiving trace 714, trace 714 may be compared to trace 704, stored in graphical reference 720. Graphical reference 720 may be stored at first user device 702. Comparison module 716 may compare trace 704 with trace 714.

The graphical reference may be used to identify first user device 702 from second user device 706. Based on the comparison, second user device 706 may identify first characteristics related to first user device 702 and second characteristics related to second user device 706. Second user device 706 may use the first and second characteristics to distinguish between first user device 702 and second user device 706. Second user device 706 may transmit the first and second characteristics to first user device 702. First user device 702 may use the first and second characteristics to distinguish between the first user device 702 and second user device 706.

The first and second characteristics may be attributed to physical differences between first user device 702 and second user device 706. For example, first user device 702 may be a desktop computer and second user device 706 may be a laptop computer. The first characteristics may be characteristics such as calibration, pressure sensitivity and/or any other suitable characteristics of first user device 702. The second characteristics may be characteristics such as calibration, pressure sensitivity and any other suitable characteristics of second user device 706. Characteristics such as calibration, pressure sensitivity and any other suitable characteristics may affect the user's drawing motions. First user device 702 and second user device 706 may use the first and second characteristics to distinguish between calibration and pressure sensitivity of first user device 702 and second user device 706.

Thus, methods and apparatus for ENHANCED AUTHENTICATION LEVERAGING GRAPHICAL PASSWORDS AND BEHAVIORAL DATA are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for two-factor authentication of a user on a user device, the method leveraging graphical passwords and behavioral data, the method comprising:
creating a two-factor authentication model for logging into a user account on the user device, the creating comprising:
displaying on a graphical user interface a prompt requesting the user to create a first graphical password and an input field for receiving the first graphical password;
capturing from the input field:
the first graphical password; and
first behavioral data corresponding to biometric characteristics of the creating of the graphical password; and
creating the two-factor authentication model by storing the first graphical password as a first authentication factor and the first behavioral data as a second authentication factor;
after the creation of the two-factor authentication model, receiving a login request from the user;
in response to the login request, receiving, from the user, an input graphical password and behavioral data corresponding to the input of the graphical password, the input graphical password being a second graphical password and the behavioral data corresponding to the second graphical password being second behavioral data;
after the receiving of the input graphical password and behavioral data, initiating the two-factor authentication including:
identifying first comparison points between the second graphical password and the first graphical password;
in parallel with the identifying of the first comparison points, identifying second comparison points between the second behavioral data and the first behavioral data, the identification of the second comparison points including:
extracting first behavioral markings from the first behavioral data and second behavior markings from the second behavioral data;
adjusting the first behavioral markings using a dynamic time-based projection to adjust for expected changes in the first behavioral data from a time-period initiated with an input of the first graphical password and completed with an input of the second graphical password; and
identifying the second comparison points between the second behavioral markings and the adjusted first behavioral markings; and
determining that a sum of a number of the first and second comparison points is greater than a threshold value; and
logging the user into the user account in response to a determination that the sum of the first and second comparison points is greater than the threshold value.

2. The method of claim 1 wherein the expected changes in the first behavioral data include a decrease in user strength and coordination from the input of the first graphical password until the input of the second graphical password.

3. The method of claim 1 wherein the user device includes one or more sensors configured to capture the first and second behavioral data, the first and second behavioral data comprising a pressure level, a velocity, a speed, or a motion pattern of the user's drawing motions.

4. The method of claim 3 wherein adjusting the first behavioral markings includes adjusting the pressure level, the velocity, the speed, or the motion pattern of the user's drawing motions included in the first behavioral data.

5. The method of claim 1 wherein the first behavioral markings are adjusted using an artificial intelligence ("AI") model.

6. The method of claim 1 further including adapting the two-factor authentication model by:
logging in a data log:
each user login attempt;
a graphical password created during each login attempt; and
behavioral data corresponding to biometric characteristics of creating each graphical password;
predicting, using the data log, projected changes for a subsequent creation of a subsequent graphical password; and
during input of the subsequent graphical password, determining if the subsequent graphical password maps on the projected changes.

7. The method of claim 6 wherein the subsequent graphical password includes at least one character change from the first graphical password.

8. The method of claim 1, when the user device is a first user device, further comprising receiving at a second user device a second login request and in response to receiving the second login request:
displaying on a second graphical user interface a prompt requesting the user to input a graphical reference, the prompt including an outline of the graphical reference;
comparing a trace of the graphical reference traced on the second user device to a stored graphical reference from the first user device;
based on the comparing, identifying first characteristics related to the first user device and second characteristics related to the second user device; and
using the first and second characteristics to distinguish between the first and second user devices.

9. The method of claim 8 wherein the first characteristics and second characteristics are used to distinguish between calibration and pressure sensitivity of the first and second user devices.

10. An apparatus for two-factor authentication of a user on a user device, the apparatus leveraging graphical passwords and corresponding behavioral data, the apparatus comprising:
a processor;
a graphical user-interface configured to display:
a prompt requesting the user to create a first graphical password; and
an input field for receiving the first graphical password;
one or more sensors in electronic communication with the processor, the one or more sensors configured to capture from the input field:
the first graphical password created in the input field; and
first behavioral data corresponding to biometric characteristics of the creating of the first graphical password;
an authentication service, executed by the processor, configured to create a two-factor authentication model for logging into a user account on the user device by storing the first graphical password as a first authentication factor and the first behavioral data as a second authentication factor;
the processor configured to initiate a two-factor authentication scan in response to receiving a login request from the user, the two-factor authentication scan configured to:
capture, using the one or more sensors, an input graphical password from the user and behavioral data corresponding to the input of the graphical password, the input graphical password being a second graphical password and the behavioral data corresponding to the second graphical password being second behavioral data;
after the capture of the second graphical password and the second behavioral data, identify first comparison points between the second graphical password and the first graphical password;
in parallel with the identification of the first comparison points, identify second comparison points between the second behavioral data and the first behavioral data, the identification of the second comparison points configured to:
extract first behavioral markings from the first behavioral data and second behavioral markings from the second behavioral data;
adjust the first behavioral markings using a dynamic time-based projection to adjust for expected changes in the first behavioral data as a result of natural changes in user behavioral data from a time-period initiated with an input of the first graphical password and completed with an input of the second graphical password; and
identify the second comparison points between the second behavioral markings and the adjusted behavioral markings;
determine that a sum of a number of the first and second comparison points is greater than a threshold value; and login the user into the user account in response to a determination that the sum of the first and second comparison points is greater than the threshold value.

11. The apparatus of claim 10 wherein the expected changes in the first behavioral data include a decrease in user strength and coordination from the input of the first graphical password until the input of the second graphical password.

12. The apparatus of claim 10 wherein the one or more sensors are further configured to capture a pressure level, a velocity, a speed, or a motion pattern of drawing motions of the user.

13. The apparatus of claim 12 wherein the processor is further configured to adjust the first behavioral markings by adjusting the pressure level, the velocity, the speed, or the motion pattern of the user's drawing motions included in the first behavioral data.

14. The apparatus of claim 10 wherein the processor is further configured to execute an artificial intelligence ("AI") model.

15. The apparatus of claim 10 the processor further configured to:
log in a data log:
each user login attempt;
a graphical password created during each login attempt; and
behavioral data corresponding to biometric characteristics of creating each graphical password;
predict, using the data log, projected changes for a subsequent creation of a subsequent graphical password; and
during input of the subsequent graphical password, determine if the subsequent graphical password maps on the projected changes.

16. The apparatus of claim 15 wherein the subsequent graphical password includes at least one character change from the first graphical password.

17. The apparatus of claim 10 when the user device is configured to be a first user device, further including a second user device, the second user device configured to receive a second login request and in response to receipt of the second login request the second user device further configured to:
display, on a second graphical user interface, a prompt requesting the user to input a graphical reference, the prompt including an outline of the graphical reference;
compare a trace of the graphical reference traced on the second user device to a stored graphical reference from the first user device;
based on the comparison, identify first characteristics related to the first user device and second characteristics related to the second user device; and
use the first and second characteristics to distinguish between the first and second user devices.

18. The apparatus of claim 17 wherein the first characteristics and second characteristics are configured to be used to distinguish between calibration and pressure sensitivity of the first and second user devices.

19. A method for two-factor authentication of a user on a user device, the method leveraging graphical passwords and behavioral data, the method comprising:
creating a two-factor authentication model for logging into a user account on the user device, the creating comprising:
displaying on a graphical user interface a prompt requesting the user to create a first graphical password and an input field for receiving the first graphical password;
capturing from the input field:
the first graphical password created in the input field; and
first behavioral data corresponding to biometric characteristics of the creating of the first graphical password;
creating a two-factor authentication model by storing the first graphical password as a first authentication factor and the first behavioral data as a second authentication factor;
after the creation of the two-factor authentication model, receiving a login request from the user;
in response to the login request, receiving, from the user, an input graphical password and behavioral data corresponding to the input graphical password, the input graphical password being a second graphical password and the behavioral data corresponding to the second graphical password being second behavioral data;
as the user inputs the second graphical password, initiating the two-factor authentication including:
identifying first comparison points between the second graphical password and the first graphical password;
in parallel with the identifying of the first comparison points, identifying second comparison points between the second behavioral data and the first behavioral data, the identification of the second comparison points including:
extracting first behavioral markings from the first behavioral data and second behavior markings from the second behavioral data;
adjusting the first behavioral markings using a dynamic time-based projection to adjust for expected changes in the first behavioral data from a time-period initiated with an input of the first graphical password and completed with an input of the second graphical password; and
identifying the second comparison points between the second behavioral markings and the adjusted first behavioral markings; and
determining that:
more than a predetermined percentage of the second graphical password has been input; and
a sum of a number of the first and second comparison points determined from the predetermined percentage of the second graphical password is determined to be greater than a threshold value; and
logging the user into the user account in response to a determination that more than the predetermined percentage of the graphical password has been input and the sum of the first and second comparison points is greater than the threshold value.

20. The method of claim 19 wherein the first behavioral markings are adjusted using an artificial intelligence ("AI") model.

* * * * *